(12) United States Patent
Danilak

(10) Patent No.: US 7,680,969 B1
(45) Date of Patent: Mar. 16, 2010

(54) METHOD AND SYSTEM FOR IMPLEMENTING DISK IO COMMAND SPLITTING

(75) Inventor: Radoslav Danilak, Santa Clara, CA (US)

(73) Assignee: Nvidia Corporation, Santa Clara, CA (US)

(*) Notice: Subject to any disclaimer, the term of this patent is extended or adjusted under 35 U.S.C. 154(b) by 1090 days.

(21) Appl. No.: 10/847,935

(22) Filed: May 17, 2004

(51) Int. Cl.
*G06F 13/12* (2006.01)
*G06F 13/38* (2006.01)
*G11B 5/02* (2006.01)

(52) U.S. Cl. .......................... 710/74; 360/24
(58) Field of Classification Search ............ 710/74
See application file for complete search history.

(56) References Cited

U.S. PATENT DOCUMENTS 6,745,300 B1 * 6/2004 Kakiuchi ............... 711/154
6,882,608 B2 * 4/2005 Watanabe et al. ........ 369/47.32
6,915,376 B1 * 7/2005 Coulson et al. ............ 711/112
7,173,782 B2 * 2/2007 Ikeda et al. ................ 360/31
2002/0109688 A1 * 8/2002 Olarig ....................... 345/520

OTHER PUBLICATIONS

Huffman, Amber and Clark, Joni, "Serial ATA Native Command Queuing: An Exciting New Performance Feature for Serial ATA", Jul. 2003, Intel Corporation and Seagate Technology, pp. 2-4.*

* cited by examiner

*Primary Examiner*—Alford W Kindred
*Assistant Examiner*—Zachary K Huson

(57) ABSTRACT

A method and system for disk I/O (input output) command splitting in a computer system. The method includes tracking a head position of a disk drive. Upon receiving a request for data from the disk drive, a first split access is executed to read a first portion of the data and a second split access is executed to read a second portion of the data. The second split access is executed after a rotation of the disk drive. The first split access and the second split access are used to fulfill the request for data.

19 Claims, 5 Drawing Sheets

METHOD AND SYSTEM FOR IMPLEMENTING DISK IO COMMAND SPLITTING

FIELD OF THE INVENTION

The field of the present invention relates to digital computer systems. More particularly, the present invention relates computer system disk drive IO methods.

BACKGROUND OF THE INVENTION

Mass storage for a computer system is typically provided by an attached disk drive. Disk drives having size of 200 GB or more are increasingly common in desktop and laptop computer systems. Fast and efficient access to data stored on such drives is important to responsiveness and functionality of typical user applications. A typical disk drive comprises a motor to rotate the disk at a constant rate and one or more read/write heads which are positioned over a desired track on the disk by a servo mechanism. The disk drive also contains electronics to amplify the signals from the one or more heads and convert them to normal computer system digital logic levels and vice versa.

The disk surface is divided into concentric tracks (e.g., circles within circles), and data bits are magnetically recorded on the tracks. Modern high-capacity disk drives pack the bits as tightly as possible within each track. Tracks are further divided into sectors, which generally hold the least amount of data that can be read or written at one time. The disk drive initiates a read or write to a given location by positioning a read/write head radially over the right track and rotationally over the start of the right sector. For example, in order to update the disk, one or more sectors are read from the disk into the computer, changed and written back to disk.

Seek time and rotational latency comprise the two main components of data access latency for a disk drive. There is usually one head for each disk surface (e.g., platter) and all heads move together. The set of locations which are accessible with the heads in a given radial position are known as a "cylinder". The "seek time" is the time taken to seek to a different cylinder. In most circumstances, the disk is constantly rotating, so positioning the heads over the right sector is simply a matter of waiting until it rotates under the head. With a single set of heads this "rotational latency" will be on average half a revolution. Access time is generally the sum of the seek time component plus the rotational latency component.

Modern hard drives reduce rotational latency by spinning the disk at very high rpm. Since rotational latency directly affects the access time for data on the hard drive, a brute force method to reduce access time is to simply spin the hard drive at a higher rpm. For example, a disk drive spinning at 10,000 rpm will have a lower rotational latency than a disk drive spinning at 7200 rpm. Decreasing rotational latency by simply increasing disk rpm, however, becomes increasingly expensive. High-speed drive mechanisms are very sensitive and difficult to manufacture. Furthermore, high-speed drive mechanisms generate an inordinate amount of heat, cause unwanted vibration, and decrease reliability of the disk drive. Thus, a new approach for reducing the time required to retrieve a block of data stored on the hard drive (e.g., beyond merely increasing rotation rpm) is required.

The SATA2 (Serial ATA version 2) specification specifies a non-zero offset approach to reduce rotational latency for a new architecture of disk drives. The SATA2 specification comprises a new specification designed to improve the performance of disk drives. SATA2 is designed to add features that improve the data transfer speed and efficiency of SATA2 disk drives in comparison to ATA (Advanced Technology Attachment) disk drives. Generally, the SATA2 non-zero offset approach reduces rotational latency by enabling a SATA2 disk drive to read the middle of a sequential series of sectors (e.g., sectors 18-31 out of 1-31) as they pass under the disk drive's read/write head and subsequently, read the earlier sectors (e.g., sectors 1-17) of the series of sectors after a rotation of the disk brings them under the read/write head.

A significant problem with this SATA2 specification non-zero offset approach is that it only applies to new architecture disk drives manufactured in accordance with the SATA2 specification. The built-in architecture level non-zero offset approach can only be implemented with hard drives manufactured in accordance therewith. The SATA2 non-zero offset approach does nothing to reduce rotational latency for the millions of non-SATA2 disk drives that are still being manufactured, already on the market, or in the supply chain. Thus, for these "legacy" disk drives, a new approach for reducing rotational latency is required.

SUMMARY OF THE INVENTION

Embodiments of the present invention implement disk I/O command splitting to significantly reduce data access latency for disk drives. Embodiments of the present invention provide a command splitting solution that reduces the time required to retrieve blocks of data stored on widely used non-SATA2 disk drives, thereby providing a mechanism that can improve the performance of a large number of existing disk drives.

In one embodiment, the present invention is implemented as a method for command splitting disk I/O (input output) to reduce the effects of rotational latency during data read operations for a disk drive coupled to a computer system. The method includes tracking a head position of the disk drive (e.g., as the head traverses sectors of a track of the disk drive). Upon receiving a request for data (e.g., comprising a series of sectors) from the disk drive, a first split access is executed to read a first portion of the data and a second split access is executed to read a second portion of the data. The second split access is executed after a rotation of the disk drive brings the sectors of the second portion under the head. The first split access and the second split access are used to fulfill the request for data.

In one embodiment, a time stamp for a last command completion of the disk drive is recorded, and the time stamp is used for computing the head position of the disk drive. The head position can be computed based on a time of the request for data, the time stamp for the last command completion, and a rotational velocity of the disk drive. In one embodiment, a number of time stamps are stored for a corresponding number of command completions of the disk drive. The resulting command completion history is then analyzed to account for any timing inaccuracies (e.g., for computing head position) that occur due to the operation of a memory cache of the disk drive.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
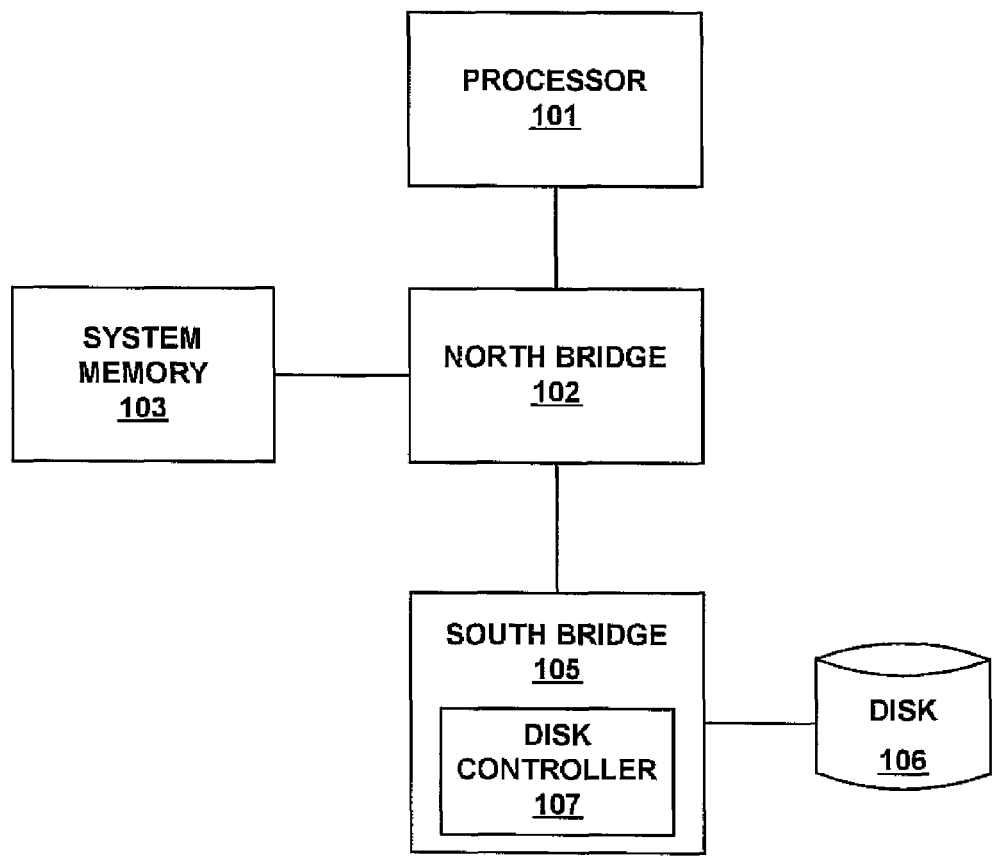
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention implement disk I/O command splitting to significantly reduce data access latency for disk drives. Embodiments of the present invention provide a command splitting solution that reduces the time required to retrieve blocks of data stored on widely used non-SATA2 disk drives, thereby providing a mechanism that can improve the performance of a large number of existing disk drives. Embodiments of the present invention and their benefits are further described below.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. These quantities take the form of electrical or magnetic signals that are stored in a physical computer readable media, and are transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "executing" or "storing" or "computing" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform

FIG. 1 shows a diagram depicting a computer system 100 showing the basic components of a computer system platform that may be used to implement the functionality of an embodiment of the present invention. The system 100 embodiment of FIG. 1 shows a general-purpose processor 101 coupled to system memory 103 via a memory controller 102 (e.g., North bridge). System 100 also shows a South bridge 105 coupled to a disk drive 106. In this embodiment, the South bridge 105 includes a disk controller 107 for controlling the disk drive 106.

Figure 6:
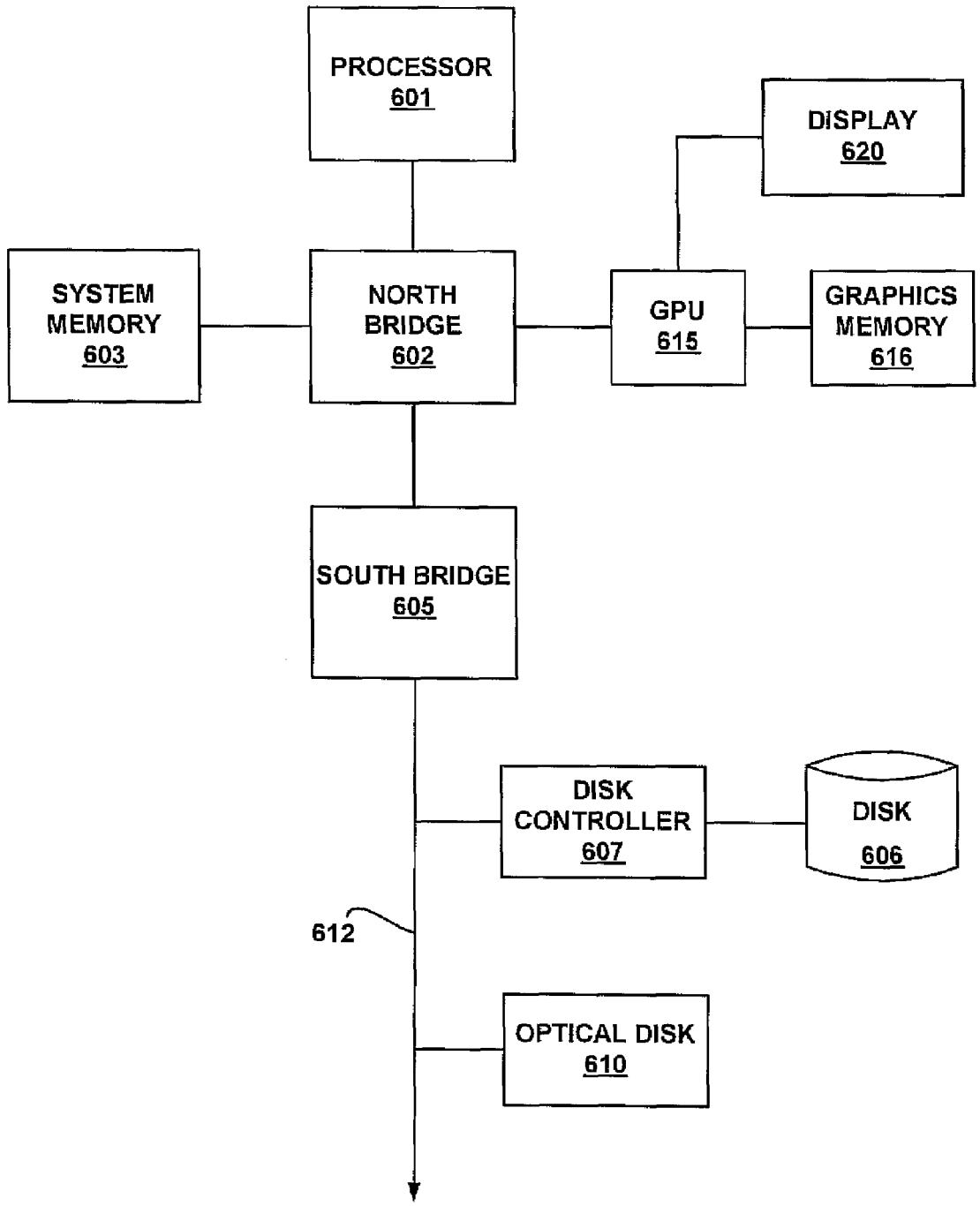
FIG. 6 shows a diagram of a computer system in accordance with an alternative embodiment of the present invention.

It should be noted that the computer system 100 embodiment shows one configuration of a computer system platform that can implement the functionality of the present invention. The specific configuration of a computer system in accordance with the present invention can change in accordance with specific requirements of a given application. For example, components can be included that add specialized peripheral buses (e.g., 1394, USB, etc.), network connectivity (e.g., Ethernet, Bluetooth, etc.), specialized graphics functions and graphics memory (e.g., high-performance graphics processor units, local graphics memory, etc.), IO devices (e.g., keyboards, mice, etc.), and the like. Although the system 100 embodiment shows two bridge components (e.g., North bridge 102 and South bridge 105), system 100 can be implemented with a single bridge component, for example where the North bridge 102 and the South bridge 105 are combined. Similarly, the disk controller 107 can be a discrete component coupled to the South bridge 105 via a bus (e.g., as opposed to being integrated). An example of such an embodiment is shown in FIG. 6 below.

Accordingly, computer system 100 can function as the basic computer system platform for a laptop, desktop, or server computer system, or for a set-top gaming device such as, for example, as an X-Box™ or similar gaming device or console. Additionally, it should be noted that the term CPU is used herein generally, and thus can be implemented as a number of different types of processors for a number of different types of computer system devices, such as, for example, an embedded processor, a graphics processor (e.g., specialized for performing graphics computations), a multi-processor subsystem, and the like.

Figure 2:
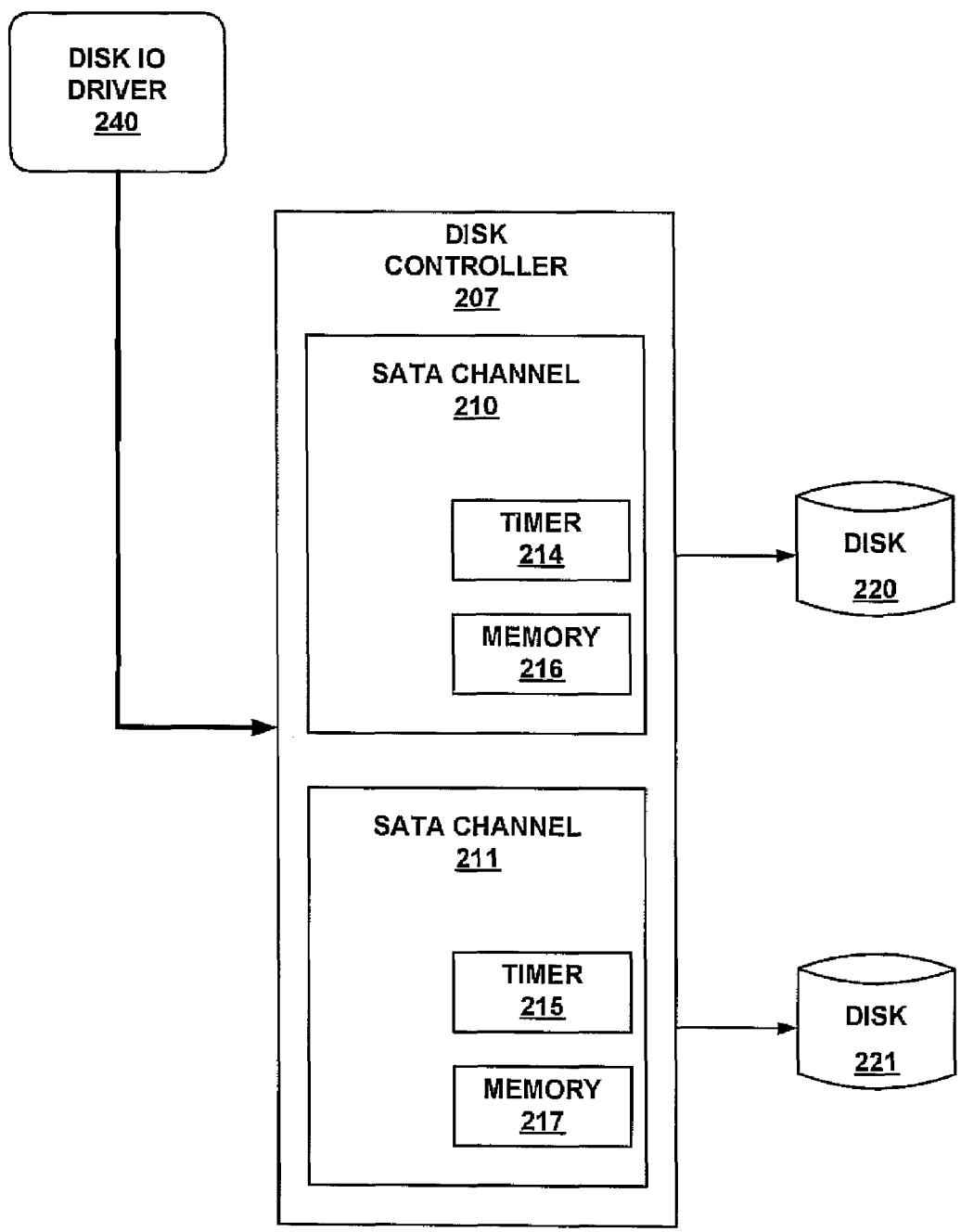
FIG. 2 shows a diagram of a disk controller in accordance with one embodiment of the present invention.

FIG. 2 shows a diagram 200 of a disk controller 207 in accordance with one embodiment of the present invention. As depicted in FIG. 2, the disk controller 207 includes a first SATA channel 210 and a second SATA channel 211, coupled to the disk drives 220-221 as shown.

The disk controller 207 embodiment of FIG. 2 functions by implementing a command splitting disk I/O method. The disk controller 207 includes two SATA channels 210-211. Each channel 210-211 includes a timer (e.g., timers 214-217) and a memory (e.g., memories 216-217). The components 214-217 enable the disk controller 207 to track the position of the read/write heads of the disk drives 220-221.

In the present embodiment, the read/write head tracking is performed by recording a time stamp for one or more previous command completion(s) of the disk drive. The head position of the disk drive is then computed by using the time stamp for the last command completion. For example, in the case of a read request to the disk 220, when a prior disk I/O request is received from the disk I/O driver 240 (e.g., executing on the processor 101 of the computer system), upon completion of the request, a corresponding command completion is recorded within the memory 216. This command completion has a time stamp reflecting its time of completion. The time stamp is generated with reference to the timer 214, which comprises an accurate timing mechanism.

An accurate time stamp for the last command completion enables the computing of the head position of the disk drive 220 at a later point in time. For example, on a subsequent request to the disk drive 220, the timer 214 will yield an accurate time for this request. Based on the time of this request, the time stamp for the last command completion, and a rotational velocity of the disk drive (e.g., 7200 rpm), the current head position for the request can be computed.

It should also be noted that although two disk drives 220-221 are shown in FIG. 2, embodiments of the present invention are suited to other numbers of disk drives and hard disk controllers having other numbers of channels. Similarly, although SATA channels are shown, embodiments of the present invention can be implemented with IDE channels for ATA disk drives.

Figure 3:
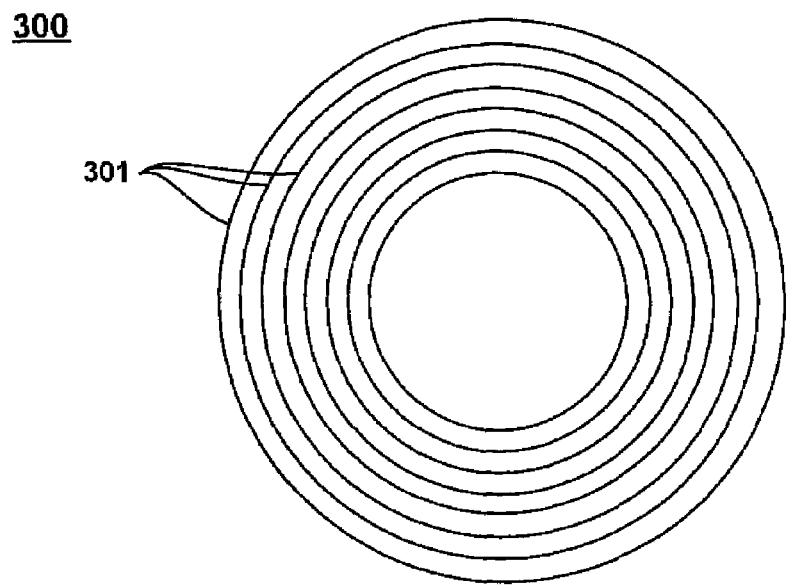
FIG. 3 shows a diagram depicting a plurality of tracks of a disk platter of a disk drive in accordance with one embodiment of the present invention.
Figure 4:
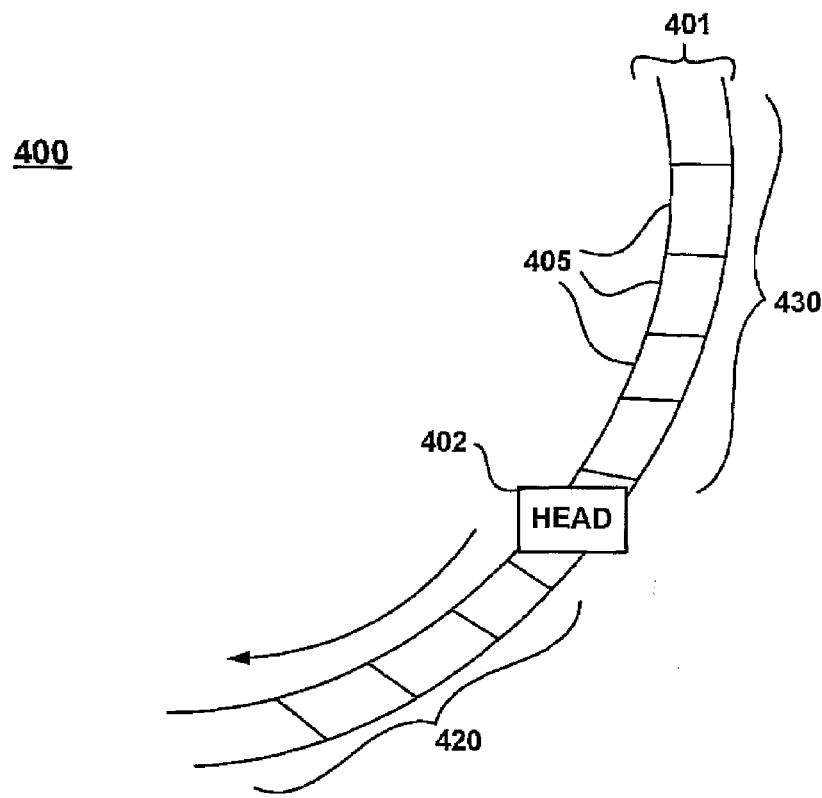
FIG. 4 shows a diagram depicting the position of a read/write head of the disk drive as the sectors of one track rotate beneath the read/write head in accordance with one embodiment of the present invention.

FIG. 3 shows a diagram 300 depicting a plurality of tracks 301 of a disk of a disk drive (e.g. disk drive 220) and FIG. 4 shows a diagram 400 depicting the position of a read/write head of the disk drive as the sectors of one track 401 rotate beneath it.

Knowledge of the current position of the read/write head 402 enables the disk controller 207 to make intelligent decisions regarding whether an incoming I/O command (e.g., the read request to the disk drive 220) should be split. The disk surface is divided into a plurality concentric tracks (e.g., tracks 301). The data bits are recorded as a series of bits organized into the sectors (e.g., sectors 405). Each sector typically stores around 512 bytes of information. Accordingly, a read request (e.g., for a block of data) typically includes a number of sectors laid out in a series along the track. This is shown in FIG. 4 as the first portion 430 of the sectors and the second portion 420 of the sectors along the track 401.

On those occasions where the position of the head 402 is among the series of sectors that comprise a read request, as shown in diagram 400 of FIG. 4, the disk controller 207 can decide to split the command into first and second "split commands". For example, a first split command would comprise a command to read the portion 430 of the sectors and a second split command would comprise a command to read the portion 420 of the sectors. Thus, the first split command could execute immediately as the first portion 430 rotates beneath the head 402. The second split command would then wait until the portion 420 substantially completes a revolution and comes back under the head 402.

In this manner, a significant portion of a read request can be executed immediately, as opposed to waiting for the head 402 to move into position at the first sector of the read request. This ability to split commands significantly reduces the time required to retrieve blocks of data stored on the disk drive. Performance is improved by immediately reading/transmitting data from those sectors that are immediately in front of the head 402 at the time of the request. This benefit is provided even with non-SATA2 disk drives which do not support non-zero offsets. For example, even though the commands are split, the first set of sectors of the portion 430 and the second set of sectors of the portion 420 are read sequentially, in accordance with requirements of the non-zero offset hardware of the disk drive.

It should be noted that in one embodiment, a plurality of time stamps for a corresponding plurality of command completions of the disk drive can be stored in the memory (e.g., memories 216-217) of the disk controller 207. The plurality of time stamps can then be analyzed to account for a memory cache of the disk drive when computing the head position of the disk drive. For example, command completions can occur early in those cases where the requested data resides within a cache memory of the disk drive. By analyzing a history of the command completions, the early completions can be identified and their effects on the head prediction calculations filtered out.

It should also be noted that in one embodiment, the disk controller 207 and the driver 240 are configured to build a sector map for disk drive in order to account for the location of the bad sectors on the individual disks (e.g. platters) of the disk drive. As known by those skilled in the art, when a disk drive emerges from the factory, the one or more disks comprising the drive have a number of bad sectors. The bad sectors are mapped and accounted for as the drive is initially calibrated and configured at the factory. The manufacturer typically does not make this data available to a system integrator or an end-user.

Accordingly, in order to enable precise head position tracking, one embodiment of the present invention maps the amount of time it takes to read the sectors of each track of a hard drive. The number of bad sectors within a track, and distribution of bad sectors within the track, will cause variation in the amount of time it takes to read the track. This data is recorded and is subsequently used in the head position tracking calculations.

Figure 5:
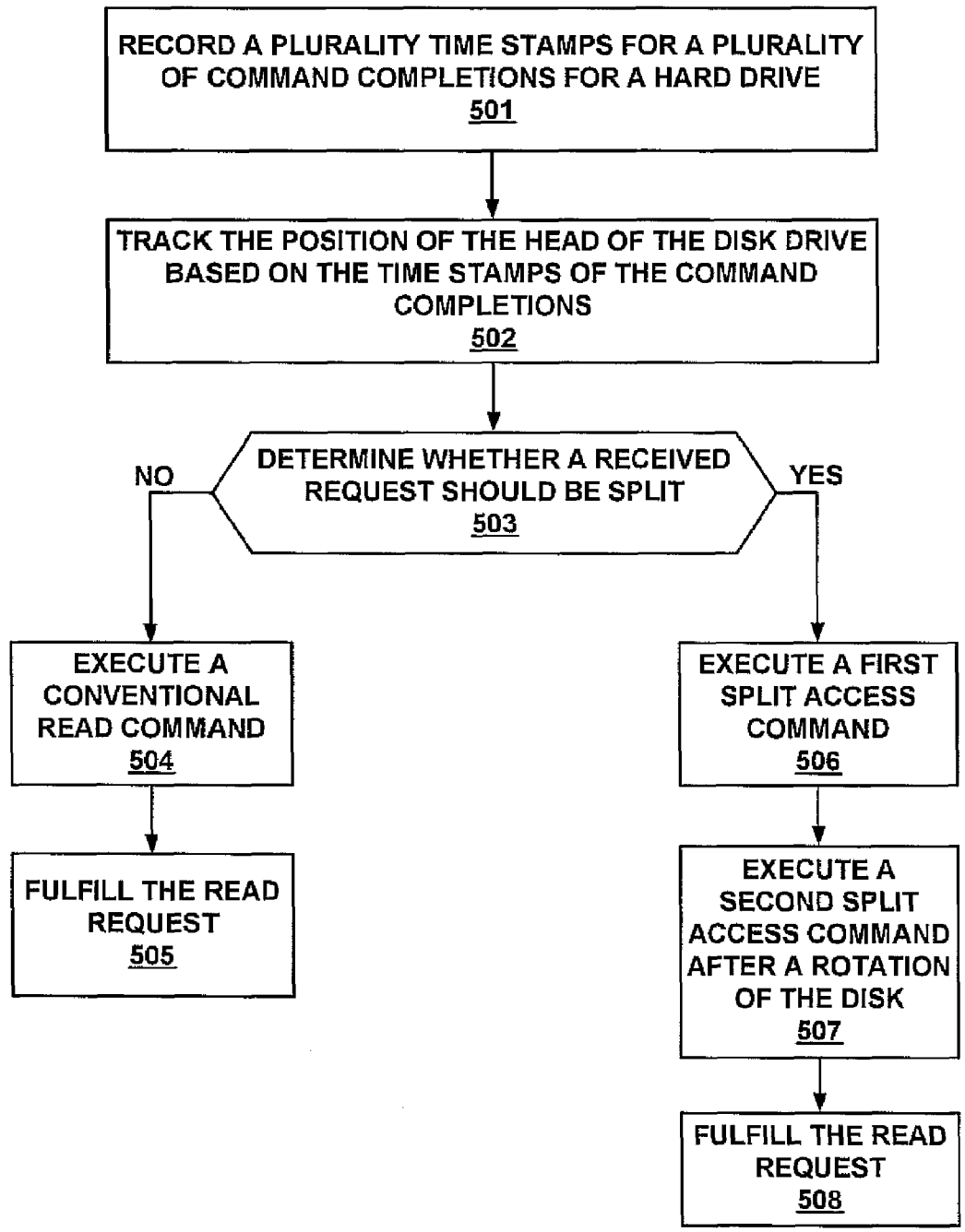
FIG. 5 shows a flowchart of the steps of a command splitting disk I/O process in accordance with one embodiment of the present invention.

FIG. 5 shows a flowchart of the steps of a process 500 in accordance with one embodiment of the present invention. As depicted in FIG. 5, process 500 shows the steps of a command splitting disk I/O method as implemented by a computer system (e.g., computer system 100 of FIG. 1).

Process 500 begins in step 501, where a plurality of time stamps are recorded for a corresponding plurality of command completions for a disk drive. In step 502, the position of the head of the disk drive is tracked based on the time stamps of the command completions. As described above, the time stamps for the last command completions and a rotational velocity of the disk drive enable the current head position to be computed. In step 503, a read request is received and a determination is made as to whether the request should be split. As described above, if the predicted head position places the head of the disk drive within the plurality of sectors that comprise the requested data, then the disk I/O driver (e.g., disk I/O driver 240) can make a determination to split the read command.

In step 506, if a split command is implemented, a first split access command is executed on a first portion of the requested data. In step 507, a second split access command is executed on a second portion of the requested data after the disk drive substantially completes a revolution. In step 508, the read request is fulfilled. In step 504, if a split command is not implemented, a conventional read command is executed, and in step 505, the read request is fulfilled.

FIG. 6 shows a diagram of a computer system 600 in accordance with an alternative embodiment of the present invention. Computer system 600 is substantially similar to computer system 100 of FIG. 1. Computer system 600 shows a discrete GPU 615 (graphics processor unit) and a discrete disk controller 607. The computer system 600 includes a general-purpose CPU 601 coupled to system memory 603 via a memory controller 602 (e.g., North bridge). In this embodiment, a South bridge 605 is coupled to a discrete disk drive controller 607 and an optical disk 610 (e.g., DVD ROM, CD ROM, etc.) via a bus 612. The disk controller 607 is coupled to a disk drive 606. The system 600 embodiment also includes a GPU 615 coupled to drive a display 620. The GPU 615 is coupled to its local graphics memory 616.

As with computer system 100 of FIG. 1, computer system 600 can include additional components in accordance with specific requirements of a given application. Such components include, for example, specialized peripheral buses (e.g., 1394, USB, etc.), network connectivity (e.g., Ethernet, Bluetooth, etc.), and the like.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for splitting a disk I/O (input output) command in a computer system, comprising:
   tracking a head position of a disk drive, and mapping a plurality of bad sectors of the disk drive by recording a time variation incurred for reading each track of the disk drive, and accounting for the bad sectors in each track, and the time variation caused by each corresponding bad sector, when computing the head position;
   receiving a request for data from the disk drive;
   executing a first split access to read a first portion of the data; and
   executing a second split access to read a second portion of the data after a rotation of the disk drive, wherein the first split access and the second split access are used to fulfill the request for data for the disk I/O command.

2. The method of claim 1, further comprising:
   recording a time stamp for a last command completion of the disk drive; and
   computing the head position of the disk drive by using the time stamp for the last command completion.

3. The method of claim 2, further comprising:
   computing the head position of the disk drive based on a time of the request for data and the time stamp for the last command completion and a rotational velocity of the disk drive.

4. The method of claim 2, further comprising:
   storing a plurality of time stamps for a corresponding plurality of command completions of the disk drive; and
   analyzing the plurality of time stamps to account for a memory cache of the disk drive when computing the head position of the disk drive.

5. The method of claim 2, wherein the time stamp is generated based on a timer within a disk controller coupled to the disk drive.

6. The method of claim 1, further comprising:
   analyzing the request for data from the disk drive to determine whether the request should be converted into the first split access and the second split access.

7. The method of claim 1, wherein the request for data comprises a request to read a series of sectors from the disk drive, and wherein the first portion comprises a first set of the series of sectors and the second portion comprises a second set of the series of sectors.

8. The method of claim 1 wherein the disk drive is compatible with a version of the ATA standard.

9. A computer system for implementing a command splitting method for efficient disk I/O (input output), comprising:
   a processor;
   a system memory coupled to the processor;
   a bridge component coupled to the processor; and
   a disk controller coupled to the bridge component, wherein the processor executes software code stored in the system memory, the software code causing the computer system to implement a method comprising:
   tracking a head position of a disk drive, and mapping a plurality of bad sectors of the disk drive by recording a time variation incurred for reading each track of the disk drive, and accounting for the bad sectors in each track, and the time variation caused by each corresponding bad sector, when computing the head position;
   receiving a request for data from the disk drive;
   executing a first split access to read a first portion of the data for a disk I/O command; and
   executing a second split access to read a second portion of the data after a rotation of the disk drive, wherein the first split access and the second split access are used to fulfill the request for data for the disk I/O command.

10. The system of claim 9, further comprising:
    recording a time stamp for a last command completion of the disk drive; and
    computing the head position of the disk drive by using the time stamp for the last command completion.

11. The system of claim 10, further comprising:
    computing the head position of the disk drive based on a time of the request for data and the time stamp for the last command completion and a rotational velocity of the disk drive.

12. The system of claim 10, further comprising:
    storing a plurality of time stamps for a corresponding plurality of command completions of the disk drive; and
    analyzing the plurality of time stamps to account for a memory cache of the disk drive when computing the head position of the disk drive.

13. The system of claim 9, wherein the time stamp is generated based on a timer within a disk controller coupled to the disk drive.

14. The system of claim 9, further comprising:
    analyzing the request for data from the disk drive to determine whether the request should be converted into the first split access and the second split access.

15. The system of claim 9, wherein the request for data comprises a request to read a series of sectors from the disk drive, and wherein the first portion comprises a first set of the series of sectors and the second portion comprises a second set of the series of sectors.

16. The system of claim 9 wherein the disk drive is a SATA disk drive.

17. A computer memory having computer readable code which when executed by a processor of a computer system cause the computer system to implement a command splitting method for efficient disk I/O (input output), comprising:
    tracking a head position of a disk drive, and mapping a plurality of bad sectors of the disk drive by recording a time variation incurred for reading each track of the disk drive, and accounting for the bad sectors in each track, and the time variation caused by each corresponding bad sector, when computing the head position;
    recording a time stamp for a last command completion of the disk drive;

computing the head position of the disk drive by using the time stamp for the last command completion;

receiving a request for data from the disk drive for a disk I/O command;

analyzing the request to determine whether the request should be converted into a first split access and a second split access; and if the request should be converted:

executing a first split access to read a first portion of the data; and executing a second split access to read a second portion of the data after a rotation of the disk drive, wherein the first split access and the second split access are used to fulfill the request for data for the disk I/O command.

18. The computer memory of claim 17, further comprising:

computing the head position of the disk drive based on a time of the request for data and the time stamp for the last command completion and a rotational velocity of the disk drive, wherein the time stamp is generated based on a timer within a disk controller to the disk drive.

19. The computer memory of claim 17, further comprising:

storing a plurality of time stamps for a corresponding plurality of command completions of the disk drive; and analyzing the plurality of time stamps to account for a memory cache of the disk drive when computing the head position of the disk drive.

\* \* \* \* \*